United States Patent Office 3,521,229
Patented July 21, 1970

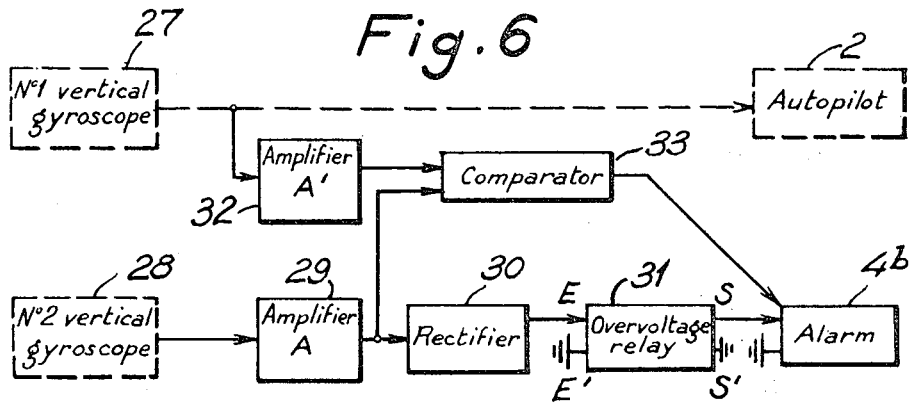
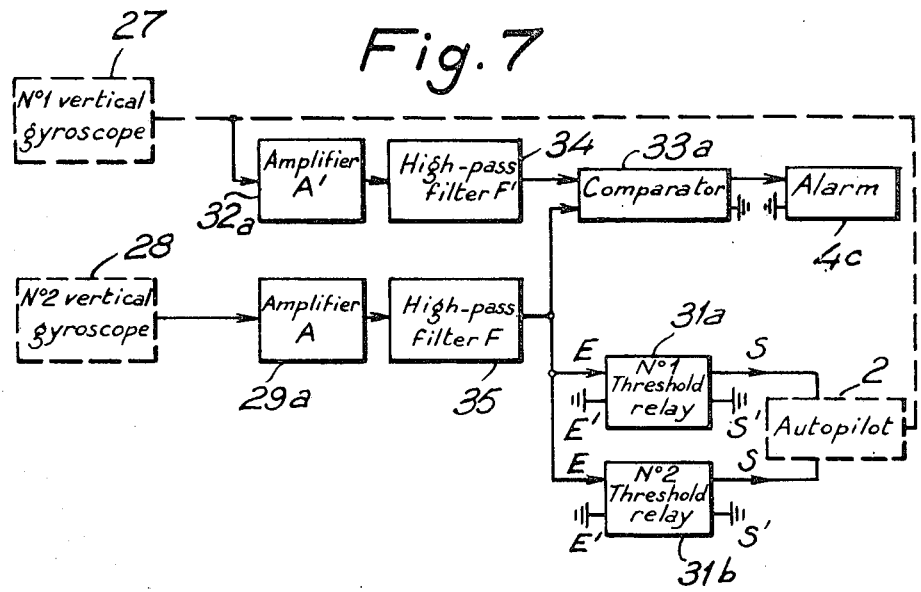
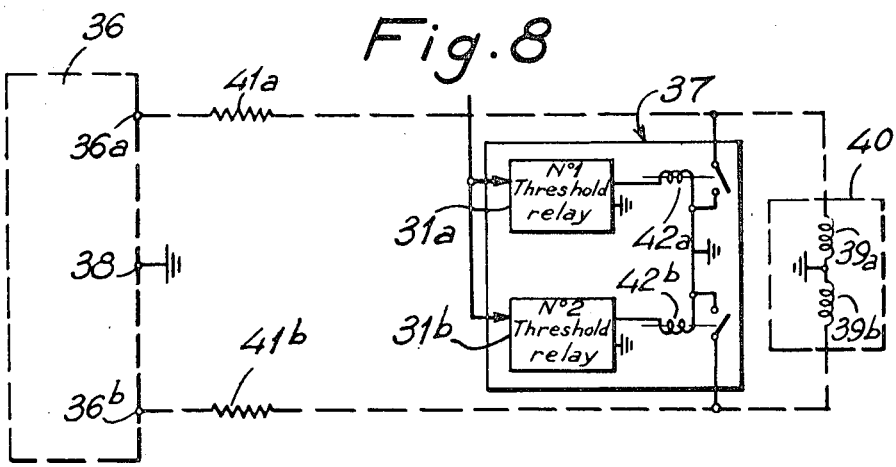

3,521,229
SAFETY DEVICE FOR USE IN AIRCRAFT DURING AUTOMATIC LANDING
Jacques Charles Henri Joseph Lepers and Jean Christian Delprat, Toulouse, France, assignors to Sud-Aviation Société Nationale de Constructions Aeronautics, Paris, France
Filed Feb. 16, 1967, Ser. No. 616,656
Claims priority, application France, Sept. 2, 1966, 75,016
Int. Cl. G08g 5/00
U.S. Cl. 340—27　　　　　　　　　　　　　　26 Claims

ABSTRACT OF THE DISCLOSURE

A safety device for use in aircraft comprises a first sensor for sensing deviation of an aircraft flight path from a radio guidance beam, a second sensor for sensing the angle of bank of the aircraft and a third sensor for sensing its rate of oscillation, the three sensors being connected to a warning system for actuation thereof when either the deviation of the flight path or the angle of bank exceeds a predetermined value, and to neutralize a servo-motor connected to an auto-pilot and optionally actuate the warning system when the oscillation rate of the aircraft exceeds a predetermined value.

---

This invention relates to a device which includes means for sensing each of the following three parameters, to wit, deviation of an aircraft flight path from a radio guidance beam, its angle of bank and its rate of oscillation, in which these sensing means set off a warning system when either the deviation of the flight path or the angle of bank exceeds a predetermined value, and neutralize a servomotor and possibly set off a warning system when the oscillation rate of the aircraft exceeds a predetermined value.

Already known are certain devices for making landings in poor visibility safer. As a rule these devices consist in monitoring the autopilot elements of the aircraft so as to detect possible errors, and it is sometimes the practice to multiply the number of autopilots and to so contrive their operation and monitoring as to ensure that they jointly possess a "fail-safe capability," that is to say that they should be able to jointly survive any internal failure.

The use of such devices not only entails big increases in weight, cost and installation complexity, but raises above all some doubt as to their ability to ensure adequate reliability in the event of certain disturbances independent of the autopilot proper, resulting for example from:

An exceptionally strong gust of wind occurring at a critical moment, or, what is worse, several gusts succeeding one another at any unfavorable rate.

Defects in the flight controls on an aging aircraft which, while they might not be of a serious character in normal flight, assume importance when landing, at which time it is essential to have greater precision of operation of all components, Faulty adjustment of a flight control balancer at a time when a change of adjustment is necessary precisely in order to ensure good subsequent precision, or Unsatisfactory operation of one of the aircraft engines, which could cause either a sudden asymmetrical thrust or cyclically varying asymmetry in one direction or the other, due notably to the effect of the autothrottle.

The effect of atmospheric disturbances on the flight path and attitude of the aircraft could become quite unacceptable, particularly if the radio guidance beams are accompanied by noise beyond the tolerance limit, over a frequency range low enough for the system formed by the aircraft and its autopilot to respond.

Only internal failures of the autopilot or autopilots used in the devices referred to can be detected, so that the degree of reliability offered by such devices is limited notwithstanding their complexity.

It is the object of the present invention to overcome these drawbacks by making it possible to sense the movements of the aircraft itself in order, firstly, to give a warning when the aircraft sustains exaggerated motion which upon landing could result in a dangerous situation which the pilot might not perceive soon enough and, secondly, in the event of sudden banking of the aircraft, to immediately neutralize, only in the required sense, one or more of the servo-motors controlled by the autopilot so as to prevent them from exerting corrective action with a rapidity in excess of an acceptable value.

Though specifically designed for use on civil transport aircraft, the device according to this invention can readily be adapted for other applications or other types of aircraft without departing from the the scope of the invention.

Such a device consists of a plurality of components added externally to an existing autopilot, without the need as a rule to modify the latter or its installation on the aircraft in any way.

In particular, the present invention provides enhanced safety on an aircraft equipped with a single autopilot suitable for automatic landings but devoid of self-monitoring devices. The invention can nonetheless be applied to an aircraft equipped with a self-monitored autopilot or with a plurality of autopilots forming a so-called fail-safe system. In such cases it provides the inherent safety which the self-monitoring feature cannot afford, by warning the pilot of possible danger resulting from external disturbances which the autopilot or autopilots would correct either inadequately or not at all.

The subject device of this invention does not preclude recourse, should this be considered advantageous, to redundancy methods consisting in multiplying the autopilot and safeguard elements, in order to increase the probability that a system in correct operating order will be available whenever the crew requires it.

The essential feature of the device according to the present invention is consequently that of sensing the very motions of the aircraft and of triggering, on the basis of this sensing function, the two warnings and the neutralization effect referred to precedingly.

The lateral motions of the aircraft to be considered are defined by three parameters which introduce the notion of time in different ways, namely deviation of the flight path from the lateral-guidance beam, the degree of bank and the rate of roll.

In what follows it will be assumed that the guidance system used for the approach is the radio system commonly abbreviated ILS, since it is in use throughout the world; obviously, however, the subject device of the invention could readily be adapted to any other kind of guidance system.

Should the aircraft lurch suddenly for any reason, the first thing to be detected will obviously be the rate of roll. In contrast, sensing deviation of the flight path from the lateral-guidance beam arises only if the deviation is very slow. As for sensing the degree of bank, this is necessary in order to fill a possible gap between these two extreme cases.

It is now proposed to explain how each of these three sensing functions is used and to give an order of magnitude of the activating thresholds to be adopted in each case:

(a) Deviation of the flight path from the lateral-guidance radio beam

This parameter, which is involved on the most long-term basis, is used to warn the pilot if the deviation in either sense exceeds a threshold beyond which it could be dangerous for the pilot, not warned, to allow the approach to continue to be effected automatically.

The triggering threshold to be set will vary according to the narrowness of the runway, the width of the landing gear, inaccuracy in the alignment of the azimuth guidance beam and inaccuracy in centering of the ILS receiver.

Depending on the type of aircraft and the runways it uses, it is customary to adopt a threshold of 10 to 15 millivolts, the measurement being made at the ILS receiver output. This threshold corresponds to a lateral deviation of about 8 to 12 metres at the touchdown zone of the runway.

In this way a fairly narrow corridor is defined which converges towards the guidance transmitter and within which the autopilot must keep the aircraft so that the approach can be carried out under acceptable conditions.

The warning given through this sensing function is alone involved in the event of very slow deviation of a flight path, due either to inadequate performance of an autopilot in otherwise good operating order (as the result of external disrupting factors such as failure of an outboard engine) or to a slow drift or a passive failure of the autopilot, such as cutting off of a guidance signal or an inoperative servo-motor; in the latter case there might be no warning provided that the aircraft remained inside the same corridor, whereas a self-monitored autopilot would give the alarm unnecessarily.

(b) Degree of bank

This parameter, the variations in which are sensed on a long or medium-term basis, is used to give a warning if it reaches an excessive value. It becomes operative in cases where an anomaly due to any cause imparts to the aircraft a rate of roll insufficient to operate the alarm provided for hereinbelow under paragraph (c), yet large enough for the angle of bank of the aircraft to assume dangerous proportions before deviation from the flight path could activate the warning provided for under paragraph (a) above.

The triggering threshold to be adapted, which will vary with the type of aircraft, must leave a margin sufficient to avert an accident at touchdown under any circumstances. A value of 4 degrees in each sense is usually acceptable.

The degree of bank can be sensed by using the direct signal delivered by a vertical gyroscope, providing the latter is properly set in the aircraft, for a 1-degree error in the setting could result in the alarm being set off for only 3 degrees of true bank in one direction—resulting in sudden undesirable triggering of the alarm—and 5 degrees in the other direction, resulting in reduced safety on that particular side.

If necessary, such asymmetrical warning can be avoided by feeding the gyroscope signal through a high-pass filter with a fairly long time constant of preferably 20 seconds at least, which would be tantamount to a medium-term monitoring of changes in the degree of bank of the aircraft. This refinement is usually unnecessary.

(c) Rate of roll

This parameter, which is involved on a more short-term basis, is used for two purposes:

First, to provide the pilot with the necessary safeguard in the event of a sudden lurch by the aircraft by immediately neutralizing the aileron servo-motor in the required sense, as soon and as long as the rate of roll exceeds a certain threshold, which experience shows should be set at around 2 to 2.5 degrees per second to enable the pilot to take effective action in all contingencies.

Second, to activate the warning to the pilot should the autopilot simultaneously give the aileron servomotor a command tending to increase the undesirable motion of the aircraft, i.e. if the motion is caused either by a defect in the autopilot or by a sudden disrupting influence in the azimuth guidance beam that could not be eliminated quickly enough by the ground monitoring facilities. In order to avoid unwanted activation of the warning system caused by marginal noise in the ILS beam, a slight time delay of 1 to 2 tenths of a second is systematically introduced into the alarm circuit but does not affect the neutralization process, which remains instantaneous.

In accordance with the invention, the three parameters mentioned above are monitored by means of on-board sensors similar or identical to those used by the autopilot, consisting for example of the following respectively:

An ILS receiver to monitor deviation of the flight path from the azimuth guidance beam.

A vertical gyro for monitoring the degree of bank.

A rate gyro for monitoring the rate of roll.

In a preferred form of embodiment of the invention, the number of sensors required can be reduced from three to two, since the rate of roll signal can be obtained by electrically differentiating the signal delivered by the vertical gyroscope by means of a high-pass filter with a short time constant. For, as is well known, this makes it possible to obtain a signal identical to the signal that would be obtained by causing the rate gyroscope signal to pass through a low-pass filter having the same time constant. If this time constant is chosen short enough, preferably equal to 0.1 to 0.2 second, a perfectly usable rate of roll signal can be obtained.

In that case only two sensors are used, namely a vertical gyroscope and an ILS receiver.

It should be noted that during a normal approach each sensor used delivers a signal of zero average value. Only if this signal exceeds a certain threshold value do the corresponding safety circuits operate to give the alarm.

The description which follows with reference to the accompanying non-limitative exemplary drawings will give a clear understanding of how the invention can be carried into practice.

In the drawings:

FIG. 6 is a block diagram of the device for monitoring the degree of bank, corresponding to the block diagram of FIG. 2;

FIG. 7 is a block diagram of the device for monitoring the rate of roll and for neutralizing the autopilot;

FIG. 8 shows a first embodiment of a circuit for selectively neutralizing a servo-motor included in the device of FIG. 7;

In the accompanying drawings, those components which normally exist in prior aircraft installations are shown in broken lines, while those specific to the present invention are shown schematically in solid lines.

Figure 1:
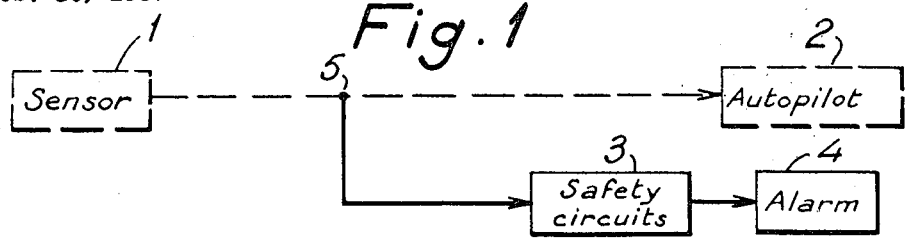
FIG. 1 is a block diagram of safety circuits used to give the alarm and which utilize one of the motion sensors associated to the autopilot.

As shown in FIG. 1, a parameter is monitored by the same on-board sensor 1 for the autopilot 2 and for the safety circuits 3 leading to the alarm 4. It will readily be appreciated that a break in the line ahead of connection point 5 would put both the autopilot and the safety circuits out of commission, so that the crew would not be warned and safety would not be assured.

Figure 2:
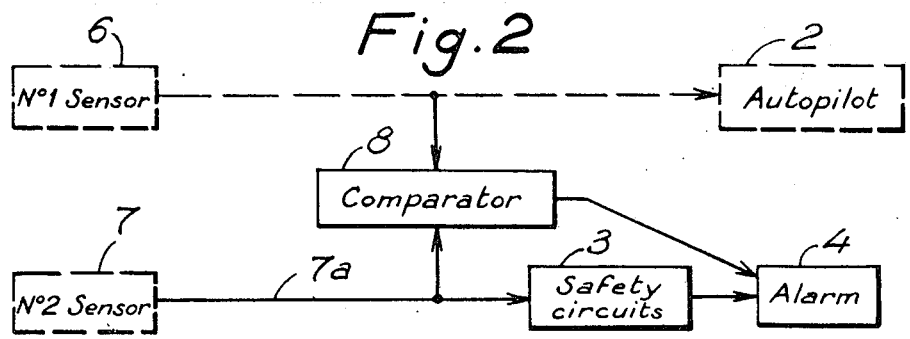
FIGS. 2 and 3 are block diagrams similar to that of FIG. 1 but utilizing two sensors.

To avoid such a situation, one solution applicable to sensors of the commonly used type consists in utilizing, jointly with the safety circuits for monitoring the different parameters, a sensor different from the one used by the autopilot, as shown in FIG. 2 in which No. 1 sensor designates the sensor 6 connected to autopilot 2 and No. 2 sensor the sensor 7 connected to safety circuits 3 and thence to alarm 4.

Manifestly, any fault in sensor 6 or autopilot 2, including functional defects of the latter under the prevailing conditions, will be detected by the safety circuits and give the crew the necessary warning. An active failure in sensor 7 will also give the alarm, but this time in undesirable fashion, whence the advantage of reducing the number of sensors. As a safeguard against a passive failure of sensor 7 or in the line 7a connecting it to safety circuits 3—a failure which would make the safety system inoperative without the pilot's knowledge—provision is made as shown in FIG. 2 for a comparator 8 designed to give the alarm should the output signals from sensors 6 and 7 fail to match.

Suitable test means well known per se, not shown, further enable the crew to check operation of comparator 8 and safety circuits 3 during the approach.

These two precautions thus make the probability of an undetected failure, during the landing, very small.

Figure 3:
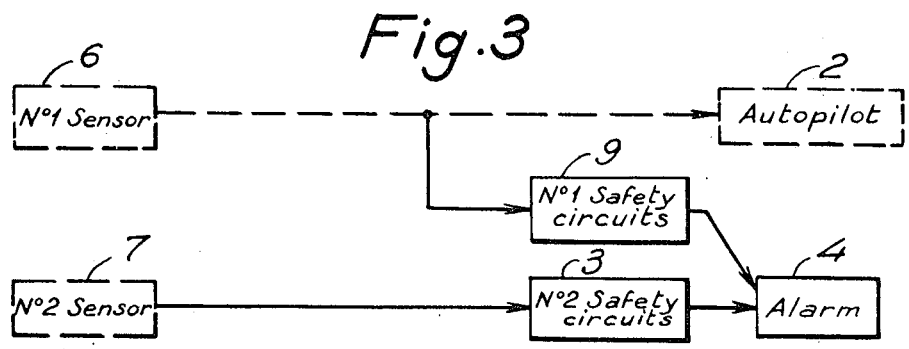

In order further to reduce this probability, recourse may be had in certain cases to an alternative embodiment of the device shown in FIG. 2 which consists, as represented in FIG. 3, in replacing comparator 8 by duplicated safety circuits connected to sensor 6, thus providing No. 1 safety circuits 9 connected to sensor 6 and No. 2 safety circuits 3 connected to sensor 7. The test devices (not shown in FIG. 3) will then be such that the crew may make separate functional checks of safety circuits 3 and safety circuits 9 by means of two push-buttons.

Non-limitative examples will now be given of embodiments of the various circuits which jointly constitute the subject safety device of the present invention.

A preferred form of embodiment of the means for monitoring deviations of the flight path from the azimuth guidance beam is shown in FIG. 3, in which sensors 6 and 7 are two ILS receivers which form part of the normal equipment of any transport aircraft. In order to warn the pilot in the event of excessive deviation, they are connected to two identical and independent sets of safety circuits, each of which will trigger the alarm when the amplitude of the signal it receives from its associated ILS receiver reaches or exceeds a certain limit value.

As stated precedingly, an order of magnitude for the triggering threshold is 10 to 15 millivolts, as the case may be, the measurement being made at the ILS receiver output.

Figure 4:
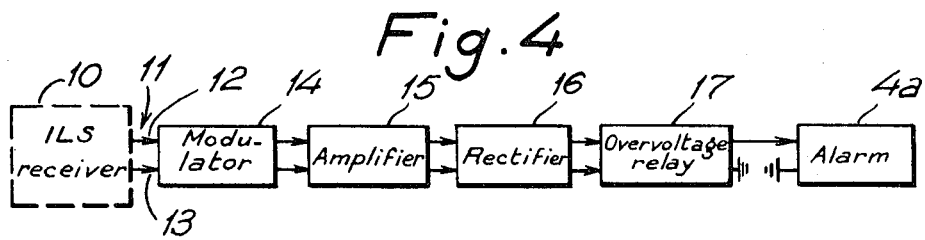
FIG. 4 is a block diagram of a safety circuit for monitoring deviation of the flight path.

FIG. 4 shows one of these two identical sets of safety circuits, which is connected to one of the receivers 10 and to the alarm 4a. As is well known, the output line 11 from receiver 10 is composed to two leads 12 and 13 across which exists a D-C voltage of amplitude proportional to the deviation from the guidance beam and of polarity dependent upon the sense of this deviation.

These two leads 12, 13 are connected to the safety circuits which, in this specific embodiment, have connected thereinto, in succession, a modulator 14, an amplifier 15, a rectifier 16 and an overvoltage relay 17 adapted to trigger alarm 4a if the voltage threshold is exceeded.

Modulator 14 converts the D-C voltage signal it receives into an A-C voltage signal of proportional amplitude.

Amplifier 15 steps up the voltage of the latter signal, and its gain is adjusted so as to trip overvoltage relay 17 when the output signal from the ILS receiver reaches the required amplitude for alarm 4a.

Rectifier 16, which can be an ordinary diode, causes the information on the direction of the deviation to be lost, so as to retain only the amplitude information, which, from the warning standpoint, is the only information of interest to the pilot since it may concern either an accidental fault in the guidance beam or a faulty approach in relation to a perfect guidance beam.

Each of the three functional elements 14, 15 and 16 mentioned above is well known to the specialist in the art and need not therefore be described in greater detail. Indeed, each is available in prefabricated modular form and it is easy to select mutually matching elements capable of solving any specific problem.

This also applies to overvoltage relay 17, the last component in the channel, which could consist for example of a Schmitt trigger followed by an ordinary relay.

Figure 5:
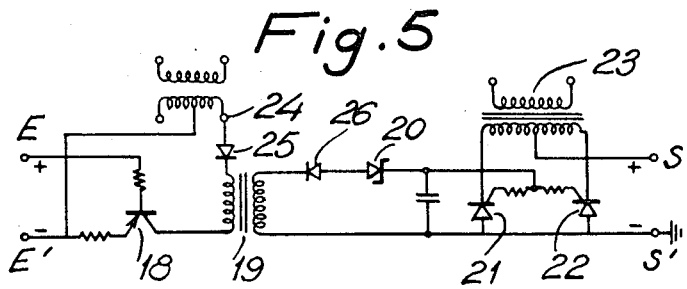
FIG. 5 is a circuit diagram of a threshold relay usable in the circuit of FIG. 4.

FIG. 5 shows an embodiment of an overvoltage relay that is particularly advantageous for implementing the subject device of the invention since it can be used at the output of all the circuits, including the comparators and the servo-motor neutralizing devices. It consists of an electronic module comprising principally a transistorized input stage 18, a coupling transformer 19, a Zener diode 20 and two controlled rectifiers 21 and 22 fed by a transformer 23.

Input transistor 18 is supplied with half-wave alternating current applied to terminal 24 and rectified by diode 25. It serves both as a low-gain amplifier and as a phase or polarity discriminator. In its collector circuit is a pulsating current proportional to the input signal applied across terminals EE', providing E is positive with respect to E'; otherwise the collector current is zero.

The alternating component of this pulsating current is transmitted to the following stages by transformer 19. It is rectified by diode 26 but the current will flow only if the input signal amplitude is large enough to "enable" Zener diode 20, which sets the triggering threshold. When this occurs the control electrodes of controlled rectifiers 21, 22 are raised to a potential large enough to enable them to behave like ordinary rectifiers, whereupon there is available across output terminals SS' the voltage delivered by transformer 23 and rectified into full-wave current. This voltage is enough to light a warning lamp or produce any other effect, either directly or through a relay.

Considering next monitoring of the degree of bank, the safety circuits for warning the pilot, if for any reason the angle of bank exceeds the safety limit in an automatic approach, can be provided as shown by the block diagram in either FIG. 2 or FIG. 3.

Reference is now had to FIG. 6 for an exemplary application corresponding to FIG. 2.

The sensors used in this example are two vertical gyroscopes 27, 28, which form part of the equipment of all transport aircraft. As is well known, such gyroscopes provide roll information in the form of alternating current signals of amplitude proportional to the degree of bank and phase dependent upon the direction of bank.

The signals from No. 2 vertical gyroscope 28, which is not connected to the autopilot, are applied to the safety circuits proper. The circuits comprise, in succession, an amplifier 29, a rectifier 30 and an overvoltage relay 31 capable of activating alarm 4b; they operate in exactly the same way as the circuits in FIG. 4, except that they are devoid of a modulator since the signal delivered by gyroscope 28 is already in alternating current.

Contrarily to the representation on FIG. 2, comparator 33 is not connected directly to the output of the two gyroscopes. The signals delivered by gyroscope 27 are applied to an amplifier 32 identical to the one used for the safety circuits, and in this case the outputs of amplifiers 29 and 32 are compared. This makes it possible to use a less sensitive comparator 33 and to monitor the safety circuits amplifier 29 which, should it fail, would render the circuits inoperative. The likelihood of a prohibitive angle of bank at the end of the approach, without a corresponding warning, is considerably reduced since overvoltage relay 31 is a very simple component most unlikely to fail during the few tens of seconds elapsing between the functional test performed by the pilot and touchdown.

A description of comparator 33 would fall outside the scope of this invention, for many different models are in common use on aircraft, and all that is necessary is to select a reliable one.

Consideration will next be given to monitoring of the rate of roll. This involves, firstly, selectively neutralizing the roll-axis channel of the autopilot in order to prevent the latter from rapidly aggravating the situation and, secondly, warning the pilot to take over manual control.

With regard to neutralization of the autopilot, the design of the safety circuits for selectively neutralizing the aileron servo-motor is based on the fact that it is invariably possible, regardless of the type of servo-motor, to selectively neutralize it by operating on the electric wiring through which the commands from the autopilot servo-amplifier are transmitted to it. An example will be described hereinafter of application to a servo-motor comprising two control solenoids (respectively assigned to deflection of the control surface in one direction and the other), since many servomotors of this type are readily available. It is, however, to be understood that this example is by no means limitative, and that the selective neutralization method can be adapted to other types of servomotor, by connecting into their wiring system, if need be, electronic switches that will allow the current to pass only if it has a certain polarity or phase and cut it off if it has the opposite polarity or phase.

Obviously, neutralization achieved in this manner will be reliable only provided that the servo-motor itself can be regarded as such, i.e. incapable of applying a deflecting moment on the control surface unless it receives a command. This assumption is usually safe enough for the likelihood of an internal failure in the servo-motor during the last seconds preceding the landing to be considered negligible. For if this were not so, the probability of a serious failure during cruise flight would be very high and the servo-motor would therefore have to be equipped with self-monitoring devices that would operate equally during landing.

FIG. 7 shows a form of embodiment in accordance with the invention of a selective neutralizing device which is designed to operate when the rate of roll becomes excessive.

As already stated, in order to reduce the number of sensors required for safety, it is of advantage not to sense the rate of roll $\varphi'$ by means of a rate gyro, but rather to differentiate it electrically by means of a high-pass filter F off the $\varphi$ signal delivered by a vertical gyroscope. The sensors used are consequently the aircraft's two vertical gyros, namely the counterparts of the gyros 27, 28 in FIG. 6.

The filter time constant must be chosen fairly short, and experience has shown that a value of about 0.2 second was very well suited to transport aircraft. This being so, in order to obtain the required operating threshold i.e. about 2.5 degrees per second, the system must be capable of activating selective neutralization when the signal undergoes a $2.5 \times 0.2 = 0.5$ degree change only in the angle of bank, which requires a fairly heavy amplification.

In the final analysis, therefore, the safety circuits proper connected to the gyroscope 28 not used by autopilot 2 consist of an amplifier 29a or amplifier A having its gain adjusted so as to ensure the required operating threshold, this amplifier being followed by a 0.2 second high-pass filter 35 or filter F. Next follow, in parallel, Nos. 1 and 2 threshold relays 31a and 31b, respectively assigned to neutralizing the autopilot 2 aileron servo-motor to port and to starboard.

In order that a failure possibly occurring in gyroscope 28, amplifier 29 or filter 35, after the functional test performed by the pilot, should not impair safety without the pilot's knowledge, a duplication is effected with an amplifier 32a and a filter 34 connected to gyroscope 27, and a comparator 33a is used at the output end, as shown in FIG. 7, to warn the pilot by an alarm 4c in the event of failure to match.

The amplifiers, filters, and comparator call for no special description, being well known to the specialist in the art and commonly utilized in autopilot technology.

The two overvoltage relays 31a, 31b used in the exemplary embodiment described are of the same kind as that in FIG. 5, but the supply voltage applied to terminal 24 in each case is, in the case of one of the relays, in phase with the on-board reference voltage and, in the other, in opposition of phase. As a result, only one of the two threshold relays 31a, 31b can operate at a time, and which of the two is tripped depends on the phase of the signal applied to its input terminals EE', i.e. on the direction of roll. This provides the required discrimination and thus permits selective neutralization in the desired sense in order to prevent the servo-motor from increasing the rate of roll.

Consideration will lastly be given to the manner in which the aileron servo-motor can be neutralized in one direction or the other when one of the threshold relays 31a, 31b operates, i.e. when a positive voltage appears on its output terminal S, while the other threshold relay continues to behave like an open circuit.

FIG. 8 shows a first embodiment of a selective neutralizing device 37. The autopilot servo-amplifier 36 feeds, off its terminals 36a and 36b, after the fashion of a symmetrical push-pull stage with respect to ground 38, the two solenoids 39a and 39b of autopilot servo-motor 40 assigned respectively to commanding banking to port or to starboard by operating on the aileron (not shown).

It has been assumed in this example that the command signals delivered by the autopilot on terminals 36a or 36b had negative polarity with respect to ground 38, and included in the circuitry are limiting resistors 41a and 41b, such as exist in most aircraft installations and the function of which is to limit the maximum torque which servo-motor 40 can apply to the flight control system.

Such limiting resistors 41a, 41b customarily have high resistance rating in comparison with the electrical resistance of solenoids 39a and 39b, so that either solenoid can be neutralized by by-passing it to ground without having to break the electrical continuity from servo-amplifier 36.

In FIG. 8, threshold relays 31a and 31b operate ordinary mechanical relays 41a and 42b which upon being energized effect this by-pass to ground and thereby render the corresponding solenoid 39a or 39b of servo-motor 40 inoperative whereby to achieve the required selective neutralization.

Figure 9:
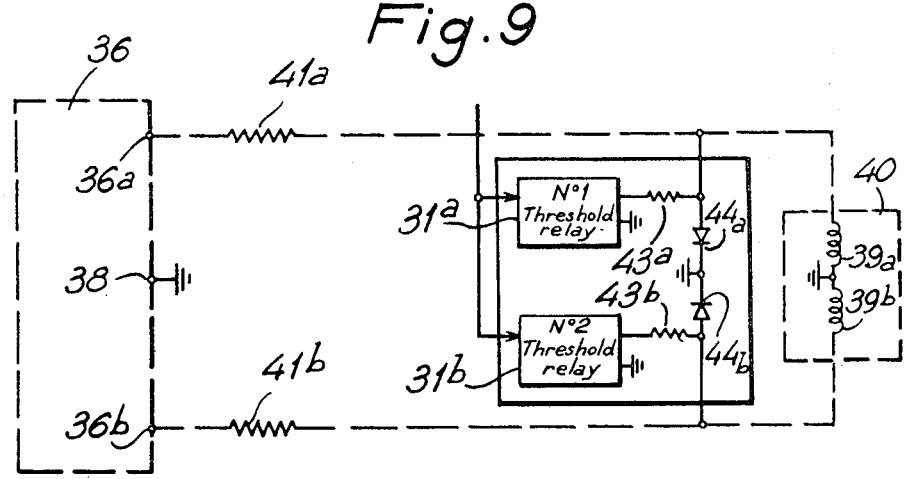
FIG. 9 shows an alternative embodiment of such a neutralizing circuit.

In an alternative embodiment shown in FIG. 9, the use of mechanical relays 42a and 42b is avoided in order to increase the reliability of the neutralizing system. This is feasible when limiting resistors 41a and 41b both have a rating big enough in comparison with the resistance of each solenoid 39a and 39b for the aggregate consisting of servo-amplifier 36 and one of the limiting resistors to be regarded as a "current generator" feeding the corresponding solenoid, which is usually the case. To cancel out the maximum current that the autopilot can deliver in this solenoid, all that is then necessary is to connect in parallel with this current generator a further similar generator of opposite polarity, consisting as shown in FIG. 9 of a threshold relay 31a or 31b and a limiting resistor 43a or 43b, the latter being chosen so that the current delivered by this generator is somewhat less than the saturation current of servo-amplifier 36.

The slight current differential delivered thus will flow through the solenoid being considered, and it will suffice that it generate at the output of servo-motor 40 a torque less than the flight control actuation threshold for neutralization to become effective, i.e. for the ailerons to revert to zero deflection.

Visible on FIG. 9 are two diodes 44a and 44b parallel-connected to solenoids 39a and 39b. These diodes are essential in order to prevent the safety system from countering operation of the autopilot when the latter is functioning correctly. It will first be noted that if threshold relays 39a, 39b deliver no current, the diodes are so connected that they will not allow the control currents delivered by the autopilot to pass, so that they remain ineffective. Conversely, they may allow the current delivered by the threshold relays to pass, in which case operation is as follows: if one of these relays (31a) delivers current to the corresponding solenoid 39a while the autopilot delivers current into the other solenoid 39b, there will be established across the terminals of the diode 44a which shunts the first solenoid 39a a small difference in potential since this diode operates in the conductive mode, so that the current flowing through solenoid 39a remains negligible and will not oppose normal operation of the autopilot.

This makes the safety system incapable of causing control surface deflection on its own, and consequently unable to cause an active failure even if it were to operate inadvertently because of a defect, a requirement which is met in the embodiment shown in FIG. 8.

Only if the circuit of one of the diodes were to be accidentally opened, a highly unlikely contingency, particularly if the precaution is taken to duplicate diodes 44a and 44b with other paralleled diodes, would the safety system be activated, i.e. become capable of deflecting the control surface if it were triggered. But in this case the autopilot would immediately react to counter such a disrupting influence and, by virtue of the precaution mentioned precedingly concerning the choice of resistors 43a and 43b, such a failure would be once more transformed into a passive failure and warning given to the pilot in good time by the other safety circuits.

It will be appreciated from the preceding description that the design of the device for providing protection against sudden banking of the aircraft due to a possible disturbance in the autopilot or the ILS beam is extremely simple. The device could be formed by an association of the components in FIGS. 7 and 9, which are complementary, and in which the threshold relays 31a, 31b shown thereon are manifestly the same. It will be noted furthermore that the amplifiers 29, 32 of FIG. 6 can be the same as the amplifiers 29a, 32a of FIG. 7, where greater amplification is required. This can be accomplished by providing in FIG. 6 a gain adjusting potentiometer connected past rectifier 30. Also to be noted is the fact that comparators 33 in FIG. 6 and 33a in FIG. 7 may likewise be identical, since it will be advantageous, for monitoring two gyroscopes in relation to each other, to combine, prior to comparison, their direct signals with the derivative thereof which constitutes an anticipatory term designed, in the event of a failure, to give warning more rapidly and if necessary to cut off the autopilot.

The selective neutralizing device 37 as hereinbefore described is supplemented by alarm means for warning the pilot in the event of a malfunction, i.e. when selective neutralization is triggered at the same time as a command is dispatched by the autopilot to the aileron servo-motor 40 in the sense that would tend to magnify the lurching motion if the servo-motor were not already neutralized.

Figure 10:
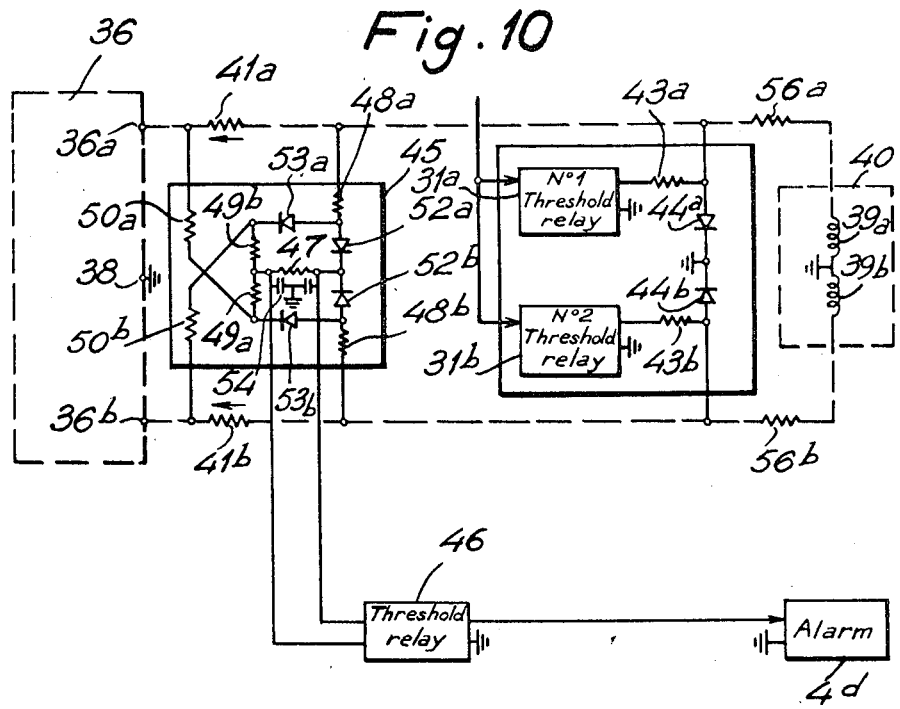
FIG. 10 is a circuit diagram corresponding to FIG. 9, showing the inclusion of a warning device relevant to neutralization.

This dual requirement can be met by an alarm circuit 45 and an additional threshold relay 46, both shown on FIG. 10.

Alarm circuit 45 consists of an AND logic circuitry comprising:

A resistor 47 across the terminals of which appears the voltage sensed by the threshold relay 46 responsible for activating alarm 4d, Six high-rating by-pass resistors respectively designated 48a, 49a, 50a, and 48b, 49b, 50b, Two main diodes 52a and 52b, Two secondary diodes 53a and 53b, and Two capacitors 54 designed to retard the warning by one- or two-tenths of a second in order to prevent unwanted activation of the alarms in the case of ILS beams in which spurious noise is just within the acceptable tolerance limit.

For a clearer understanding of the principle of operation of this circuit, it should be recalled that the command signals delivered by the autopilot on the terminals 36a and 36b are of negative polarity. The currents flowing through limiting resistors 41a or 41b consequently always flow in the direction indicated by the arrows.

Consider for example the case where the autopilot commands banking to the left: 95% of the control current passes through limiting resistor 41a and the remainder is by-passed through the circuit formed by 48a, 52a, 47, 49a and 50a. The four resistors of this by-pass circuit are chosen so that under normal operating conditions, in which solenoid 39a is not neutralized, the voltage across the terminals of resistor 47 is insufficient to activate the alarm but on the contrary becomes large enough to activate it when, with solenoid 39a shunted by the neutralizing circuit, the current delivered by the autopilot is thereby increased. This requirement can always be met, if necessary by reducing the resistances 41a and 41b and inserting the missing parts of the resistance at 56a and 56b, proximate the solenoids of servo-motor 40.

The function of secondary diodes 53a and 53b is to prevent unwanted activation of the alarm system in cases where the autopilot operates correctly but heavy atmospheric disturbances trigger the neutralizing circuits. If, for example, the aircraft banks rapidly to the left, threshold relay 31a will operate and deliver a current of positive polarity, while autopilot terminal 36b will be raised to a negative potential. Under such conditions, unless special precautions are taken, a current would flow through circuit 48a, 52a, 47, 49b and 50b and the voltage appearing as a result on the terminals of resistor 47 would accidentally activate alarm 4d.

Diode 53a enables this voltage to be cancelled since the current finds a path of lesser resistance through this diode than through circuit 52a, 47, 49b. The ultimate flow path is thus through 48a, 53a and 50b, in which resistors 48a and 50b have values large enough for operation of the autopilot to remain unaffected.

It will be noted that, strictly speaking, resistors 48a and 48b are unnecessary for operation of the alarm circuit. They could be dispensed with by correspondingly increasing resistors 50a and 50b, and are used only to improve the decoupling effect between the two servo-motor control lines and to avoid putting the autopilot out of action in the event that either of diodes 52a or 52b were to allow current through in both directions as the result of a defect.

The means used to warn the pilot are well-known per se. They may be of the audio or visual type, or both. Components 4a, 4b, 4c, 4d may either be separate in order to inform the pilot of the origin of the malfunction, or be grouped together in a single device.

It goes without saying that many changes and substitutions of parts may be made in the specific forms of embodiment hereinbefore described without departing from the spirit and scope of the invention. In particular, the subject device of this invention lends itself to the following broader applications:

(1) The selective neutralization of the aileron servo-motor can be used for flight conditions other than landing, if necessary by adopting a different, possibly higher, threshold of 5 degrees/second when the aircraft is above a certain altitude, so as not to unduly restrict the maneuvering speeds it is desired to achieve in the automatic flight mode.

(2) The device according to this invention can be used to improve aircraft safety in the longitudinal or vertical sense during automatic landings, the only difference being that the parameters to be sensed will be those characterizing longitudinal motion of the aircraft, namely deviation of the flight path from the longitudinal guidance beam, longitudinal attitude, and rate of pitch, with the corresponding detection thresholds being adapted to suit this particular application. In so far as the pitching rate is concerned, selective neutralization will then operate not on an aileron servo-motor for correcting a sudden rolling motion causing the aircraft to bank over to the left or to the right, but on an elevator servo-motor so as to provide protection against a sudden nose-up or nose-down motion.

What we claim is:

1. A device for improving aircraft safety during automatic landings made with the help of a guidance radio beam, including an autopilot, means for sensing a deviation of the flight path from said guidance beam, means for sensing a banking motion and means for sensing an oscillation rate, comprising, in combination, a set of determinate-threshold safety circuits for flight path deviations and a first alarm, one output from said flight path deviation sensing means being electrically connected to said autopilot and to said set of flight path deviation safety circuits and an output from said set of flight path deviation safety circuit being electrically connected to said first alarm; a set of determinate-threshold safety circuits for aircraft banking motion and a second alarm, one output from said banking motion sensing means being electrically connected to said autopilot and to said set of banking safety circuits and an output from said set of banking safety circuits being electrically connected to said second alarm; a set of determinate-threshold safety circuits for said oscillation rate and a third alarm, one output from said oscillation rate sensing means being electrically connected to said autopilot and to said set of oscillation rate safety circuits, and the set of said oscillation rate safety circuits being electrically connected to said third alarm.

2. A device as claimed in claim 1, wherein said flight path deviation sensing means include a first flight path deviation sensor having its output electrically connected to the autopilot, and a second flight path deviation sensor, said set of flight path deviation safety circuits comprising a first flight deviation safety circuit having an input electrically connected to the output from said first flight path deviation sensor and its output to said first alarm and a second flight path deviation safety circuit having its input electrically connected to said second flight path deviation sensor and its output to said first alarm, wherein said banking sensing means include a first banking sensor having its output electrically connected to said autopilot, and a second banking sensor, said set of banking safety circuits comprising a first banking safety circuit having an input electrically connected to the output from said first banking sensor and its output to said second alarm, a second banking safety circuit having its input electrically connected to said second banking sensor and its output to said second alarm, said oscillation rate sensing means comprising a first oscillation rate sensor having its output electrically connected to said autopilot, and a second oscillation rate sensor, and wherein said set of oscillation rate safety circuits include a first oscillation rate safety circuit having one input thereof electrically connected to the output from said first oscillation rate sensor and its output to said third alarm and a second oscillation rate safety circuit having its input electrically connected to said second oscillation rate sensor and its output to said third alarm.

3. A device as claimed in claim 2, wherein said flight path deviation sensing means are radio guidance beam receivers, said banking sensing means being vertical gyroscopes.

4. A device as claimed in claim 3, wherein said oscillation rate sensing means are rate gyroscopes.

5. A device as claimed in claim 3, wherein said oscillation rate sensing means include said vertical gyroscopes and high-pass filters of short time constant, the output from each vertical gyroscope being electrically connected to the input of a said high-pass filter the function of which is to electrically differentiate the output signal from a said vertical gyroscope.

6. A device as claimed in claim 2, wherein at least one flight path deviation safety circuit includes, in successive mutual cooperation, a modulator having its input electrically connected to the output from the associated flight path deviation sensor, an amplifier, a rectifier and an overvoltage relay having its output electrically connected to said first alarm whereby to trigger same if its voltage threshold is overstepped.

7. A device as claimed in claim 6, wherein said rectifier is a diode, said overvoltage relay comprising a Schmitt trigger having its output electrically connected to a relay.

8. A device as claimed in claim 6, wherein said rectifier is a diode, said overvoltage relay comprising, successively and in combination, a transistorized input stage, a transformer having its primary winding electrically connected to said input stage and its secondary winding to an output circuit comprising a Zener diode, and two parallel-connected controlled rectifiers supplied by a transformer.

9. A device as claimed in claim 2, wherein at least one banking safety circuit comprises, successively and in combination, an amplifier, a rectifier and an overvoltage relay, the input to said amplifier being electrically connected to the output from the associated banking sensor and the output from said overvoltage relay being electrically connected to said second alarm.

10. A device as claimed in claim 1, wherein said flight path deviation sensing means include a first flight path deviation sensor having its output electrically connected to said autopilot, and a second flight path deviation sensor, said set of flight path deviation circuits comprising a flight path deviation comparator having a first input electrically connected to the output from said first flight path deviation sensor and its output to said first alarm, a second input to said comparator being electrically connected to the output from said second sensor, and a flight path deviation safety circuit having its input electrically connected to said second flight path deviation sensor and its output to said first alarm; wherein said banking sensing means include a first banking sensor having its output electrically connected to said autopilot, and a second banking sensor, said set of banking safety circuits comprising a banking comparator of which a first input is electrically connected to the output from said first banking sensor and its output to said second alarm, a second banking comparator input being electrically connected to the output from said second banking sensor, and a banking safety circuit having its input electrically connected to said second banking sensor and its output to said second alarm; and wherein said oscillation rate sensing means include a first oscillation rate sensor having its output electrically connected to said autopilot, and a second oscillation rate sensor, said set of oscillation rate safety circuits comprising an oscillation rate comparator having a first input thereof electrically connected to the output from said first oscillation rate sensor and its output to said third alarm, a second input of said oscillation rate comparator being electrically connected to the output from said second oscillation rate sensor, and an oscillation rate safety circuit having its input electrically connected to said second oscillation rate sensor and its output to said third alarm.

11. A device as claimed in claim 10, wherein said flight path deviation sensing means are radio guidance beam receivers, said banking sensing means being vertical gyroscopes.

12. A device as claimed in claim 11, wherein said oscillation rate sensing means are rate gyroscopes.

13. A device as claimed in claim 11, wherein said oscillation rate sensing means are rate gyroscopes.

13. A device as claimed in claim 11, wherein said oscillation rate sensing means include said vertical gyroscopes and high-pass filters of short time constant, the output from each vertical gyroscope being electrically connected to the input of a said high-pass filter the function of which is to electrically differentiate the output signal from a said gyroscope.

14. A device as claimed in claim 10, wherein said flight path deviation safety circuit comprises, successively in combination, a modulator having its input electrically connected to the output from the associated flight path deviation sensor, an amplifier, a rectifier and an overvoltage relay having its output electrically connected to said first alarm whereby to activate same if its voltage threshold is overstepped.

15. A device as claimed in claim 14, wherein said rectifier is a diode, said overvoltage relay comprising a Schmitt trigger having its output electrically connected to a relay.

16. A device as claimed in claim 14, wherein said rectifier is a diode, said overvoltage relay comprising, successively in combination, a transistorized input stage, a transformer having its primary winding electrically connected to said input stage and its secondary winding to an output circuit comprising a Zener diode followed by two parallel-connected controlled rectifiers supplied by a transformer.

17. A device as claimed in claim 10, wherein said banking safety circuit comprises, successively in combination, an amplifier, a rectifier and an overvoltage relay, the input of said amplifier being electrically connected to the output from the associated banking sensor and the output from said overvoltage relay being electrically connected to said second alarm.

18. A device as claimed in claim 1, wherein said oscillation rate is the rate of roll of the aircraft and wherein the rate of roll sensing means include a first vertical gyroscope having its output electrically connected to said autopilot, and a second vertical gyroscope, the set of rate of roll safety circuits comprising a circuit for neutralizing an autopilot aileron servo-motor and a rate of roll alarm circuit having its output electrically connected to said third alarm whereby to warn the pilot of the aircraft when such neutralization is activated concurrently with a command sent by the autopilot to the aileron servo-motor in the sense that could tend to amplify rolling of the aircraft had such neutralization not been already activated.

19. A device as claimed in claim 18, wherein said aileron servo-motor neutralizing circuit comprises, successively in combination, an amplifier having its input electrically connected to the output from said second vertical gyroscope, a high-pass filter of short-time constant, two parallel-connected overvoltage relays having their outputs electrically connected to said aileron servo-motor whereby to neutralize same in leftward and rightward operation respectively, the supply voltage applied to said two relays being respectively in phase with a reference on-board voltage and in opposed-phase therewith.

20. A device as claimed in claim 18, wherein the alarm circuit associated to the set of rate of roll safety circuits comprises an AND logic circuitry having one input thereof electrically connected to said autopilot and another input thereof connected to said neutralizing circuit, an output from said logic circuitry being electrically connected to said third alarm through an overvoltage relay whereby to activate said alarm when neutralization of the servo-motor occurs concurrently with action of said autopilot tending to amplify the rolling motion of the aircraft.

21. A device as claimed in claim 20, wherein a first terminal of said autopilot and a first terminal of said neutralizing circuit are electrically connected to a first loop of said alarm circuit comprising, in series, a first resistor, a first main diode, a second resistor, and third and fourth resistors, a second terminal of said autopilot and a second terminal of said neutralizing circuit being electrically connected to a second alarm-circuit loop comprising, in series, a fifth resistor, a second main diode, said second resistor, and sixth and seventh resistors, wherein a first secondary diode is connected to a point on said first loop located between said first resistor and said first main diode and to a point on said second loop located between said sixth and seventh resistors, a second secondary diode being connected to a point on said second loop located between said fifth resistor and said second main diode and to a point on said first loop located between said third and fourth resistors, and wherein the terminals of the said second resistor common to both of said loops are electrically connected to the overvoltage relay activating said third alarm, a capacitor designed to prevent accidental activation of the alarms being connected to each of said terminals.

22. A device as claimed in claim 1, wherein the oscillation rate is the pitching rate of the aircraft and wherein the means for detecting the pitching rate include a first vertical gyroscope having its output electrically connected to said autopilot, and a second vertical gyroscope, the set of pitching rate safety circuits comprising a circuit for neutralizing an elevator control surface servo-motor of the autopilot and a pitching rate alarm circuit having its output electrically connected to said third alarm whereby to warn the pilot of the aircraft when said neutralization is activated concurrently with a command sent by the autopilot to the elevator servo-motor in the sense that would amplify the pitching motion of the aircraft had neutralization not already taken place.

23. A device as claimed in claim 22, wherein said elevator servo-motor neutralizing circuit comprises, successively in combination, an amplifier having its input electrically connected to the output from said second vertical gyroscope, a high-pass filter of short time constant, two parallel-connected overvoltage relays having their inputs electrically connected to said elevator servo-motor whereby to neutralize same respectively in pitch-up and pitch-down, the supply voltages applied to said two relays being respectively in phase with a reference on-board voltage and in opposition of phase therewith.

24. A device as claimed in claim 22, wherein the alarm circuit for said set of pitching rate safety circuits comprises an AND logic circuitry having one input thereof electrically connected to said autopilot and another input to said neutralizing circuit, an output from said logic circuitry being electrically connected to said third alarm through an overvoltage relay whereby to trigger said alarm when neutralization of said servo-motor takes place concurrently with action of the autopilot tending to amplify the pitch-up or pitch-down motion of the aircraft.

25. A device as claimed in claim 24, wherein a first terminal of said autopilot and a first terminal of said neutralizing circuit are electrically connected to a first loop of said alarm circuit comprising, in series, a first resistor, a first main diode, a second resistor, and third and fourth resistors, a second terminal of said autopilot and a second terminal of said neutralizing circuit being electrically connected to a second alarm circuit loop comprising in series a fifth resistor, a second main diode, said second resistor, and sixth and seventh resistors; wherein a first secondary diode is connected to a point on said first loop located between said first resistor and first main diode and to a point on said second loop located between said sixth and seventh resistors, a second secondary diode being connected to a point on said second loop between said fifth resistor and said second main diode and to a point on said first loop between said third and fourth resistors; and wherein the terminals of said second resistor common to both loops are electrically connected to the overvoltage relay for activating said third alarm, a capacitor designed to prevent accidental activation of the alarms being connected to each of said terminals.

26. A device as claimed in claim 1, wherein said first, second and third alarms are grouped together in a single unit.

References Cited

UNITED STATES PATENTS 3,439,321   4/1969   Sebern _____ 340—27

ALVIN H. WARING, Primary Examiner

U.S. Cl. X.R.

73—178; 235—150.22; 343—108